United States Patent [19]

Sato et al.

[11] 4,347,214
[45] Aug. 31, 1982

[54] FAILED FUEL DETECTION AND LOCATION APPARATUS

[75] Inventors: Hajime Sato, Kawasaki; Tetsuo Morisue, Yokohama; Hideaki Heki, Kanagawa, all of Japan

[73] Assignee: Tokyo Shibaura Denki Kabushiki Kaisha, Kawasaki, Japan

[21] Appl. No.: 140,609

[22] Filed: Apr. 15, 1980

[30] Foreign Application Priority Data

Apr. 23, 1979 [JP] Japan ................. 54-49107
Apr. 23, 1979 [JP] Japan ................. 54-49108
Apr. 23, 1979 [JP] Japan ................. 54-49110

[51] Int. Cl.³ ........................... G21C 17/00
[52] U.S. Cl. ....................... 376/251; 376/314
[58] Field of Search ............ 176/19 LD, 37, 38; 55/74, 176; 376/251, 314

[56] References Cited

U.S. PATENT DOCUMENTS

| | | | |
|---|---|---|---|
| 3,453,867 | 7/1969 | Webb et al. | 176/19 LD |
| 3,523,868 | 8/1970 | Dady | 176/19 LD |
| 3,922,150 | 11/1975 | Yusa et al. | 55/74 |
| 4,045,191 | 8/1977 | Martin | 55/179 |
| 4,045,539 | 8/1977 | Hirano et al. | 55/74 |
| 4,092,133 | 5/1978 | Kamiya et al. | 55/179 |
| 4,135,891 | 1/1979 | Borger et al. | 55/74 |
| 4,168,149 | 9/1979 | Armond et al. | 55/179 |

FOREIGN PATENT DOCUMENTS

| | | | |
|---|---|---|---|
| 50-11556 | 5/1975 | Japan | |
| 974314 | 11/1964 | United Kingdom | 176/19 LD |

OTHER PUBLICATIONS

Nuclear Technology, vol. 26 (8/75), pp. 472–479, Strand et al.
Proceedings of the Specialist Meeting on In-Core Instrumentation, pp. 313–340, Chantor et al., (May 13–15, 1974).

*Primary Examiner*—Sal Cangialosi
*Attorney, Agent, or Firm*—Oblon, Fisher, Spivak, McClelland & Maier

[57] ABSTRACT

Disclosed is an apparatus for detecting the location of failed fuel in a reactor, the apparatus comprising means for collecting tag gas from cover gas containing tag gas at ambient temperature and enriching the collected tag gas to an analyzable concentration and tag gas analysis means for analyzing the enriched tag gas to determine the composition thereof.

8 Claims, 4 Drawing Figures

FAILED FUEL DETECTION AND LOCATION APPARATUS

BACKGROUND OF THE INVENTION

This invention relates to a detection and location apparatus for failed fuel in a reactor utilizing tag gas.

Conventionally, there is known a failed fuel detection and location system (FFDL) in which stable tag gas with modified composition, e.g. rare gas, is previously enclosed in the respective fuel pins of a plurality of fuel assemblies disposed inside a reactor, so that the location of a broken fuel pin, if any, is detected by collecting and analyzing tag gas which is released in cover gas when such breakage is occurred.

Since the concentration of the tag gas released in cover gas in the reactor, however, is extremely low, it is impossible to determine the composition of the tag gas by directly analyzing the same, according to the existing analysis technique. Therefore, it is necessary to collect the released tag gas securely and to enrich the same to an analyzable concentration.

Conventionally, the collection and enrichment of tag gas are achieved by adsorbing the gas with low-temperature activated charcoal cooled to approximately $-80°$ C. or lower and heating it to about 350° C. for removal. In "Design and Manufacture of Gas Tags for FFTF Fuel and Control Assemblies," NUCLEAR TECHNOLOGY, vol. 26, page 472, Aug., (1975) appears a method in which tag gas is collected and enriched by using activated charcoal which is cooled to $-79°$ C. Further, stated in "Proceedings of the Specialists' Meeting on In-Core Instrumentation and Failed Fuel Detection and Location," pages 313 to 317, AECL-5124, May, (1974) is a method in which tag gas is collected by means of activated charcoal cooled to $-100°$ C. and then selectively removed by reheating and sweeping with helium. However, a low-temperature activated-charcoal adsorption apparatus requires large-sized cooling means utilizing a large quantity of liquid nitrogen. Moreover, the selective desorption of the tag gas adsorbed by low-temperature activated charcoal requires extremely difficult selection and control of desorption conditions including temperature, removal time, degree of vacuum, flow rate of sweeping gas, etc., as well as complicated operations. Furthermore, in the low-temperature activated-charcoal adsorption apparatus, impurities such as water contained in various gases may coagulate at an extremely low temperature, tending to cause clog in piping.

SUMMARY OF THE INVENTION

The object of this invention is to provide a failed fuel detection and location apparatus capable of collecting and enriching tag gas released in cover gas at normal temperature.

According to this invention, there is provided a failed fuel detection and location apparatus which comprises means for supplying cover gas containing released tag gas to collection/enrichment means for tag gas, means for collecting tag gas from the sampled cover gas at normal temperature and enriching the tag gas to an analyzable concentration, and means for analyzing the enriched tag gas.

Preferably, the collection/enrichment means for tag gas is composed of normal-temperature activated-charcoal adsorption apparatus to adsorb tag gas at normal temperature and heaters to heat their corresponding ambient-temperature activated-charcoal adsorption apparatus to remove the adsorbed tag gas. Alternatively, there may be used a gas separator including a selectively gas-permeable membrane selectively permeating tag gas at normal temperature.

DETAILED DESCRIPTION OF THE PREFERRED EMBODIMENTS

Figure 1:
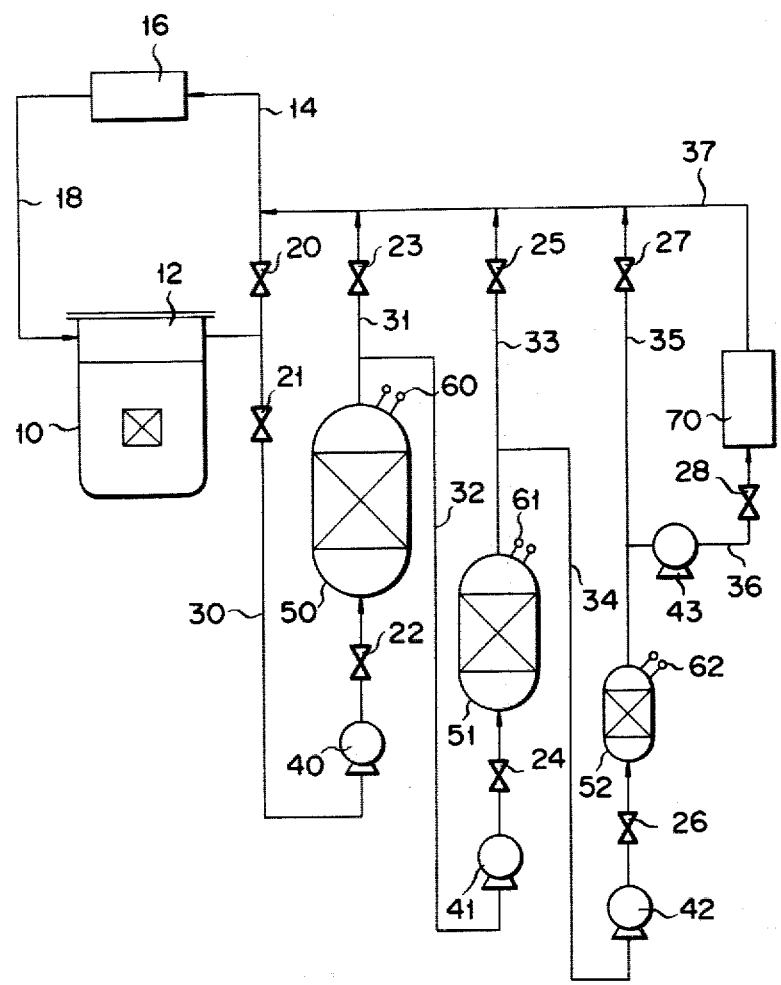
FIG. 1 is a flow sheet showing an embodiment of the failed fuel detection and location apparatus of this invention using ambient-temperature activated-charcoal adsorption devices arranged in series with one another.

Referring now to the drawing of FIG. 1 showing a first embodiment of this invention, cover gas filling a plenum 12 of a reactor 10 is passed through a main pipe or line 14, purified in a cover gas clean-up system 16, and returned to the reactor 10 by way of another main pipe or line 18, in a regular operation. When a failed fuel detector (FFD) detects that a fuel pin is broken to allow tag gas to be released into the cover gas in the plenum 12, valves 20 and 21 are closed and opened respectively, and the cover gas containing tag gas is delivered to a line 30. The cover gas containing tag gas is introduced through a valve 22 into a first activated-charcoal adsorption column 50 storing a required quantity of activated charcoal by a gas pump 40. The tag gas contained in the introduced cover gas is selectively adsorbed by activated charcoal which is kept at an ambient temperature, e.g. 50° C. The ambient temperature used herein is specifically defined as a temperature ranging from 0° C. to 60° C., as compared with a low temperature, e.g. $-80°$ C. or lower, for the conventional manner of activated-charcoal adsorption and a high temperature, e.g. 350° C. or higher, for the desorption of adsorbed tag gas. Residual gas which has not been adsorbed by the activated charcoal is returned to the line 14 by way of a line 31 and a valve 23. Thereafter, the valves 22 and 23 are closed, and the activated charcoal is heated to a high temperature of at least 350° C. by means of a heater 60 attached to the activated-charcoal adsorption column 50, thereby desorpting all the adsorbed gas. The heater may be of the same type used for the desorption of gas in the prior art low-temperature activated-charcoal adsorption apparatus. The desorbed gas is led to a gas pump 41 through a line 32, and introduced into a second activated-charcoal adsorption column 51 through a valve 24. Also in this column 51, the tag gas is selectively adsorbed by activated charcoal at the ambient temperature, and residual gas is returned to the line 14 by way of a line 33 and a valve 25. After the adsorption, the valves 24 and 25 are closed, and the activated-charcoal adsorption column 51 is heated by means of a heater 61 to desorb the adsorbed gas. The desorbed gas is led to a gas pump 42 by means of a line 34 in the aforesaid manner, and introduced into a third ambient-temperature activated-charcoal adsorption column 52 through a valve 26. Residual gas not adsorbed is returned to the line 14 by way of a line 35 and a valve 27. After the valves 26 and 27 are closed, adsorbed gas is desorbed by a heater 62, and supplied by a gas pump 43 to a gas analyzer 70 by way of a line 36 and a valve 28. The gas analyzer, which need only be able to analyze the composition of a very small amount of gas, may be a conventionally available mass spectrometer. After analysis, the gas is returned to the line 14 by way of a line 37.

Now there will be described enrichment of tag gas according to this embodiment. If argon for the reactor cover gas, xenon for the tag gas, 0.1 ppb for the tag gas concentrationm, and 160 Nm$^3$ for the volume of processed gas in the first adsorption tower are used, the weight of activated charcoal required for the collection in the first activated-charcoal adsorption column of tag gas is 460 kg, and then the concentration of xenon becomes 3 ppb. Therefore, the enrichment factor of xenon is 30. The volume of gas supplied to the second activated-charcoal adsorption tower, which is equal to the volume of argon gas adsorbed by the activated charcoal in the first activated-charcoal adsorption column, is approximately 6 Nm$^3$. Accordingly, the weight of activated charcoal required for the collection of tag gas in the second activated-charcoal adsorption column is 15 kg, and the enrichment of xenon becomes 100 ppb. Therefore, the enrichment factor of xenon is 1,000. Likewise, the volume of gas supplied to the third activated-charcoal adsorption column is 0.2 Nm$^3$, and the weight of activated charcoal required for the tag gas collection is 0.5 kg. Thus, the xenon concentration becomes 3 ppm, and the enrichment factor of xenon is 30,000. The concentration of 3 ppm is enough for the analysis.

Figure 2:
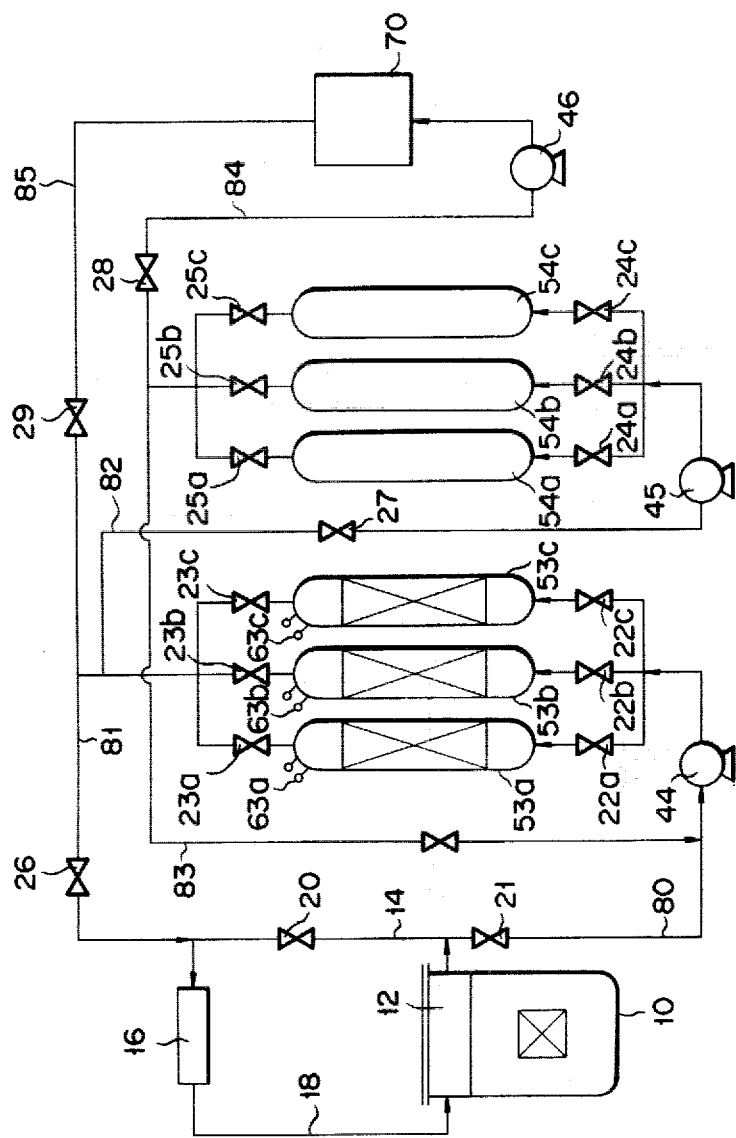
FIG. 2 is a flow sheet showing another embodiment of the apparatus of the invention using normal-temperature activated-charcoal adsorption devices arranged in parallel with one another.

Referring now to FIG. 2 showing a second embodiment of the invention, main pipes 14 and 18 connecting a reactor 10 and a cover gas clean-up system 16 are the same as those of the first embodiment. This second embodiment is characterized in that the multi-stage ambient-temperature activated-charcoal adsorption columns are arranged in parallel with one another. Cover gas containing tag gas is introduced by a gas pump 44 from valves 22a, 22b and 22c into parallel-connected ambient-temperature activated-charcoal adsorption columns 53a, 53b and 53c by way of a valve 21 and a line 80. In these activated-charcoal adsorption columns, tag gas is selectively adsorbed by activated charcoal at the ambient temperature. Residual gas is returned to the clean-up system 16 via valves 23a, 23b and 23c, a line 81, and a valve 26. After completion of the first adsorbing operation, the valves 22a, 22b, 22c and 26 are closed, and activated charcoal is heated to a high temperature, e.g. 350° C. by means of heaters 63a, 63b and 63c attached to the activated-charcoal adsorption columns 53a, 53b and 53c, thereby desorbing all the adsorbed gas. The desorbed gas is passed through a line 82 and a valve 27, and fed by a gas pump 45 to parallel-connected collecting tanks 54a, 54b and 54c respectively through valves 24a, 24b and 24c. After all the desorbed gas is collected, the valves 24a, 24b and 24c are closed, and valves 25a, 25b and 25c are opened. Then, the desorbed gas is led through a line 83 again to the ambient-temperature activated-charcoal adsorption columns 53a, 53b and 53c by the gas pump 44. In the second adsorbing operation, e.g. two adsorption columns 53a and 53b are preferably used in accordance with the reduced quantity of the gas. Like the case of the first operation, residual gas is returned to the clean-up system 16 through the line 81, and adsorbed gas is desorbed by means of the heaters 63a and 63b, and all collected in the collecting tanks 54a and 54b through the line 82. Thereafter, the same procedures are repeated for a third adsorbing operation. In this operation, the single adsorption column 53a and the single collecting tank 54a are preferably used. The tag gas concentrated by those three repeated operations is supplied by a gas pump 46 from the tank 54a to a gas analyzer 70 by way of the valves 25a, a valve 28, and a line 84. After analysis, the gas is returned to the cover gas clean-up system 16 by way of a line 85, a valve 29, and the valve 26.

Now there will be described enrichment of tag gas according to this embodiment. If argon for the reactor cover gas, xenon for the tag gas, 0.1 ppb for the tag gas concentration, and 160 Nm$^3$ for the volume of processed gas are used, the weight of activated charcoal required for the first operation is 460 kg, and after the operation the concentration of xenon becomes 3 ppb. In this case, the collecting tank requires a volume of 6 Nm$^3$. In the second operation, 6 Nm$^3$ of argon gas with 3 ppb xenon obtained in the first operation is supplied again to the activated-charcoal adsorption columns. In this case, the weight of activated charcoal required is 15 kg, and then the concentration of xenon becomes 100 ppb. Likewise, the volume required for the collection of the enriched gas is 0.2 Nm$^3$. In the third operation, 0.2 Nm$^3$ of argon gas with 100 ppb xenon obtained in the second operation is supplied again to the activated-charcoal adsorption columns. Thus, after completion of the third operation, the xenon concentration becomes 3 ppm, and the enrichment factor of xenon becomes 30,000. Accordingly, the predetermined concentration of tag gas may be obtained through repeated operations as required by previously separately disposing the activated-charcoal adsorption columns provided with the necessary quantity of activated charcoal and collection tanks.

Although 3-stage ambient-temperature activated-charcoal adsorption apparatus are used in the above-mentioned first and second embodiments, the number of stages may optionally be set in acccordance with the initial concentration of tag gas and analyzable concentration.

Figure 3:
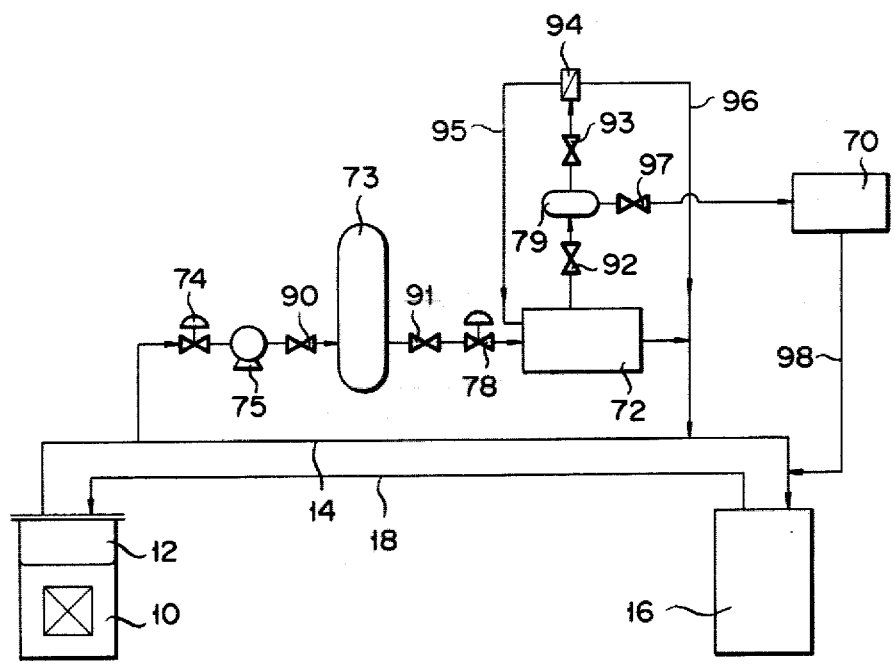
FIG. 3 is a flow sheet showing still another embodiment of the apparatus of the invention using a gas separator with a selectively gas-permeable membrane.
Figure 4:
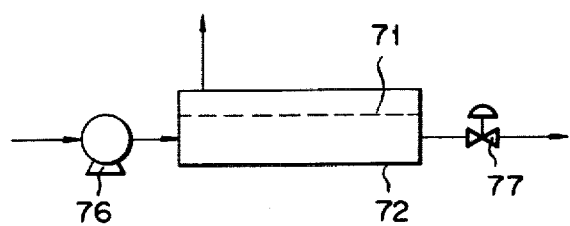
FIG. 4 is a flow sheet of the gas separator with the selectively gas-permeable membrane of FIG. 3.

Referring now to FIGS. 3 and 4, a third embodiment of the invention will be described. In this embodiment, there is used a gas separator 72 with a selectively gas-permeable membrane 71 as a means for collecting and enriching tag gas. Available for such selectively gas-permeable membrane are materials including silicone rubber, porous metals, porous seramics and tetrafluoroethylene. These selectively gas-permeable membranes selectively permeate tag gas at the ambient temperature. Since these selectively gas-permeable membranes, however, tend to be damaged by radioactivity, a storage tank 73 is preferably disposed in front of the gas separator 72.

Now there will be described an example using the apparatus of FIGS. 3 and 4. Cover gas filling a plenum 12 of a reactor 10 was supplied to a cover gas clean-up system 16 through a main pipe or line 14 at a rate of 6.5 Nm$^3$/hr to remove impurities. Then, the purified cover gas was returned to the plenum 12 by way of a main pipe or line 18. After the FFD has detected fuel failure, part of the gas flow through the main pipe 14 was caused to diverge at a rate of 0.2 Nm$^3$/hr by a flow regulating valve 74, compressed by a compressor 75, and introduced into the storage tank 73 with a volume of 1 m³. After 24 hours' introduction, a valve 90 was closed, and the radioactive gas was decayed by holding the gas for additional 24 hours. The gas pressure inside the storage tank 73 was approximately 5 kg/cm²·G, and the concentration of tag gas in the cover gas was about 0.1 ppb. Thereafter, a valve 91 was opened, and the gas was fed to the separator 72 at a rate of 0.6 Nm³/hr by means of a flow regulating valve 78. As shown in FIG. 4, the cover gas was pressurized to 5 kg/cm²·G by a compressor 76 and the tag gas was selectively permeated through the silicone rubber membrane 71 at the ambient temperature, and enriched. Permeated gas was carried into a collection tank 79 through a valve 92, whereas unpermeated gas was returned to the cover gas clean-up system 16 through a flow regulating valve 77. If no analyzable tag gas concentration is obtained by the enrichment with use of the one-stage separator, multistage cascade may be applied. In such case, the permeated gas temporarily stored in the collection tank 79 is passed through a valve 93, and a required amount of the gas is refluxed to the separator 72 through a line 95 by a distributor 94, while the remaining portion of the gas is returned to the cover gas clean-up system 16 by way of a line 96. In this example, however, all the permeated gas was refluxed to the separator 72 by the distributor 94 for 5-stage cascade. In about 4 hours thereafter, the gas was enriched with the enrichment factor of $10^4$, and cover gas containing tag gas with a concentration of approximately 1 ppm was collected in the collection tank 79. The gas was supplied through a valve 97 to a mass spectrometer 70 for analysis, and the location of failed fuel was detected. After the analysis, the gas was returned to the cover gas clean-up system 16 by way of a line 98.

According to this invention, it is possible to collect securely a very small amount of tag gas at the ambient temperature and to enrich the tag gas to an analyzable concentration. Thus, there is no need of a cooling system that has conventionally been required.

Moreover, since the ambient-temperature activated-charcoal adsorption apparatus is used, adsorbed gas can be desorbed by a simple heating operation, resulting in requiring no complicated operation for selective desorption that has conventionally been needed. When using a selectively permeable membrane, in particular, there is no need of any operation for such desorption.

Unlike the prior art low-temperature activated-charcoal adsorption apparatus, furthermore, the apparatus of this invention uses no low temperature, so that the pipes will never be clogged with water or other impurities in gas, ensuring improved safety. The improvement in safety is quite essential to the operation of reactors.

What we claim is:

1. An apparatus for detecting the location of failed fuel by analyzing tag gas consisting of rare gas released in cover gas from the failed fuel, said rare gas being at least one from the group consisting of Xenon and Krypton, comprising:
   (a) tag gas collection/enrichment means including at least two activated-charcoal adsorption columns for collecting tag gas from cover gas at an ambient temperature and for enriching said collected tag gas to an analyzable concentration, said columns being connected and being progressively smaller in volume in accordance with the increase in the degree of enrichment of the tag gas to an analyzable concentration;
   (b) a line for introducing said cover gas containing tag gas into said tag gas collection/enrichment means;
   (c) tag gas analysis means for analyzing said enriched tag gas to determine the composition thereof;
   (d) a line for supplying said enriched tag gas to said analysis means; and
   (e) a line for transmitting residual gas from which said collected gas is separated to a cover gas clean-up system.

2. An apparatus according to claim 1, wherein each said ambient-temperature activated-charcoal adsorption column is provided with a heater for desorbing adsorbed tag gas.

3. An apparatus according to claim 1, wherein said ambient-temperature activated-charcoal columns are operated within a temperature range of 0° C. to 60° C. to adsorb tag gas.

4. An apparatus according to claim 2, wherein the adsorbed tag gas is removed by heating to at least 300° C. by means of said heater.

5. An apparatus according to claim 1, wherein said ambient-temperature activated-charcoal columns are multi-stage arranged in series with one another.

6. An apparatus according to claim 1, wherein said ambient-temperature activated-charcoal columns are multi-stage arranged in parallel with one another and are each provided with a storage tank for desorbed gas, said apparatus further comprising a line for transmitting desorbed gas from each said activated-charcoal adsorption column to each corresponding storage tank and a line for refluxing gas from said storage tank to said activated-charcoal adsorption column.

7. An apparatus according to claim 5, wherein said gas separator is operated within a temperature range of 0° C. to 60° C. to permeate the tag gas selectively.

8. An apparatus for detecting the location of failed fuel by analyzing tag gas consisting of rare gas released in cover gas from the failed fuel, comprising:
   (a) tag gas collection/enrichment means including a storage tank for collecting the cover gas containing tag gas and a selectively gas-permeable membrane means including a selectively gas permeable membrane formed from one from the group consisting of silicone rubber, porous metal, porous ceramic and tetrafluoroethylene for selectively permeating tag gas at the ambient temperature;
   (b) a line for introducing said cover gas containing tag gas into said tag gas collection/enrichment means;
   (c) tag gas analysis means for analyzing said enriched tag gas to determine the composition thereof;
   (d) a line for supplying said enriched tag gas to said analysis means; and
   (e) a line for transmitting residual gas from which said collected gas is separated to a cover gas clean-up system.

* * * * *